US012155160B2

(12) United States Patent
Toh et al.

(10) Patent No.: US 12,155,160 B2
(45) **Date of Patent: *Nov. 26, 2024**

(54) COMPACT POWER CONNECTOR AND METHOD FOR MAKING SAME

(71) Applicant: VOLEX CABLE ASSEMBLY (ZHONGSHAN) CO., LTD, San Ysidro, CA (US)

(72) Inventors: Mui Lian Jessica Toh, Singapore (SG); Chum Liu, Hunan (CN)

(73) Assignee: VOLEX CABLE ASSEMBLY (ZHONGSHAN) CO., LTD, San Ysidro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,370

(22) Filed: Sep. 15, 2023

(65) Prior Publication Data

US 2024/0006826 A1 Jan. 4, 2024

Related U.S. Application Data

(63) Continuation of application No. 17/921,037, filed as application No. PCT/US2020/035868 on Jun. 3, 2020.

(30) Foreign Application Priority Data

Apr. 24, 2020 (CN) ......................... 202010332342.9

(51) Int. Cl.
*H01R 24/20* (2011.01)
*H01R 4/18* (2006.01)
(Continued)

(52) U.S. Cl.
CPC ............... *H01R 24/20* (2013.01); *H01R 4/18* (2013.01); *H01R 13/405* (2013.01); *H01R 43/24* (2013.01); *H01R 2103/00* (2013.01)

(58) Field of Classification Search
CPC ....... H01R 24/20; H01R 13/405; H01R 43/24
See application file for complete search history.

(56) References Cited

U.S. PATENT DOCUMENTS 2,425,670 A * 8/1947 Buell ..................... H01R 13/26 439/746
2,973,501 A 2/1961 Mapelsden et al.
(Continued)

FOREIGN PATENT DOCUMENTS

CN 1371536 A 9/2002
CN 101588004 A 11/2009
(Continued)

OTHER PUBLICATIONS

International Patent Application No. PCT/US2020/035868; Int'l Search Report and the Written Opinion; dated Aug. 19, 2020; 9 pages.
(Continued)

*Primary Examiner* — Neil Abrams
(74) *Attorney, Agent, or Firm* — BakerHostetler

(57) ABSTRACT

A compact electrical power connector including a cable with cores surrounded by cable insulation. Each core includes a wire surrounded by core insulation. Removed cable insulation exposes each core and removed core insulation exposes each wire. Each wire is reverse crimped to a corresponding terminal placed within a cable holder that supports and routes each core. The assembled cable holder is inserted into a housing including housing terminal slots corresponding to each terminal. An inner mold is injected around the exposed end of the cable holder, any exposed core and a first portion of the terminal end of the cable. An over mold with integrated flange is injected around the exposed surfaces of the housing, the inner mold and a second portion of the terminal end of the cable adjacent the first portion.

19 Claims, 8 Drawing Sheets

(51) Int. Cl.

| | |
|---|---|
| ***H01R 13/405*** | (2006.01) |
| ***H01R 43/24*** | (2006.01) |
| *H01R 103/00* | (2006.01) |

(56) References Cited

U.S. PATENT DOCUMENTS

| | | | | |
|---|---|---|---|---|
| 3,668,779 | A | 6/1972 | Turner | |
| 4,043,630 | A | 8/1977 | Suverison et al. | |
| 4,484,792 | A | 11/1984 | Tengler et al. | |
| 4,737,124 | A | 4/1988 | Ezure et al. | |
| 5,000,695 | A | 3/1991 | Nishiyama et al. | |
| 5,171,168 | A | 12/1992 | Chiodo | |
| 5,186,658 | A | 2/1993 | Kikuchi et al. | |
| 5,560,981 | A | 10/1996 | Ito | |
| 5,603,368 | A | 2/1997 | Colson et al. | |
| 5,785,543 | A | 7/1998 | Dietrich | |
| 6,179,669 | B1 | 1/2001 | Chiang et al. | |
| 6,183,309 | B1 | 2/2001 | Chiang et al. | |
| 6,290,512 | B1 | 9/2001 | Mullen, Jr. | |
| 6,371,808 | B2 | 4/2002 | Sakaguchi | |
| 6,855,007 | B2 | 2/2005 | Irish et al. | |
| 7,785,153 | B2 | 8/2010 | Wang et al. | |
| 8,408,947 | B2 * | 4/2013 | Lorenzo Riera | H01R 27/00 439/701 |
| 9,337,570 | B2 | 5/2016 | Inagaki et al. | |
| 10,873,165 | B2 | 12/2020 | Komada et al. | |
| 11,114,791 | B1 * | 9/2021 | Lee | H01R 43/24 |
| 11,258,209 | B2 | 2/2022 | Zhao et al. | |
| 11,791,595 | B2 * | 10/2023 | Toh | H01R 13/405 439/682 |
| 2008/0305682 | A1 | 12/2008 | Wu | |
| 2016/0036155 | A1 | 2/2016 | Kataoka et al. | |
| 2017/0358890 | A1 | 12/2017 | Chen et al. | |
| 2023/0120961 | A1 | 4/2023 | Toh et al. | |

FOREIGN PATENT DOCUMENTS

| | | | |
|---|---|---|---|
| CN | 102356528 | A | 2/2012 |
| CN | 103424815 | A | 12/2013 |
| CN | 104241917 | A | 12/2014 |
| CN | 104319551 | A | 1/2015 |
| CN | 107112698 | A | 8/2017 |
| CN | 108432062 | A | 8/2018 |
| JP | H07-312253 | A | 11/1995 |
| JP | 2001-167838 | A | 6/2001 |
| JP | 2014-235981 | A | 12/2014 |

OTHER PUBLICATIONS

International Patent Application No. PCT/US2020/035868; International Preliminary Report on Patentability; dated May 31, 2022; 16 pages.

* cited by examiner

COMPACT POWER CONNECTOR AND METHOD FOR MAKING SAME

CROSS REFERENCE TO RELATED APPLICATIONS

This application is a continuation of U.S. patent application Ser. No. 17/921,037, filed Oct. 24, 2022; which is a 371 U.S. National Stage Entry Application of PCT/US2020/035868, filed Jun. 3, 2020; which claims priority to Chinese Application 202010332342.9 filed Apr. 24, 2020; the contents of each of which are incorporated herein by reference in their entirety.

FIELD OF THE INVENTION

The disclosure relates to power connectors for electrical devices.

BACKGROUND

Traditional connectors crimp the wire of a core between the end of the core and the terminal. This causes the traditional connector to be more elongated and therefore occupy more horizontal space. For a short profile connector where horizontal space is a constraint, the traditional crimp will not meet the short profile requirements.

Generally, the matching of a connector with its receiving inlet leaves a visible gap surrounded the frame of the receiving inlet and provides an unfinished cosmetic effect on the chassis of the equipment being powered. One traditional solution to this problem is to incorporate a separate flange into the connector body that is able to cover up the gap surrounding the frame of the receiving inlet. This flange provides a flush effect with the equipment profile and enhances the cosmetic finish of the equipment, such as at the back of a monitor or any IT equipment. As a separate element, however, the flange can compromise the integrity of the connecter and lessen its tensile strength.

SUMMARY

The disclosure provides a compact electrical power connector. The connector includes a cable with a plurality of cores surrounded by cable insulation. Each core among the plurality of cores includes a wire surrounded by core insulation. A terminal end of the cable has a portion of the cable insulation removed to expose a portion of each core and each core has a portion of the core insulation removed to expose a portion of each wire. Each wire is reverse crimped to a corresponding terminal placed within a cable holder that supports and routes each core. The assembled cable holder is inserted into a housing including housing terminal slots corresponding to each terminal. An inner mold is injected around the exposed end of the cable holder, any exposed core and a first portion of the terminal end of the cable. An over mold with an integrated flange is injected around the exposed surfaces of the housing, the inner mold and a second portion of the terminal end of the cable adjacent the first portion.

DETAILED DESCRIPTION

Figure 1:
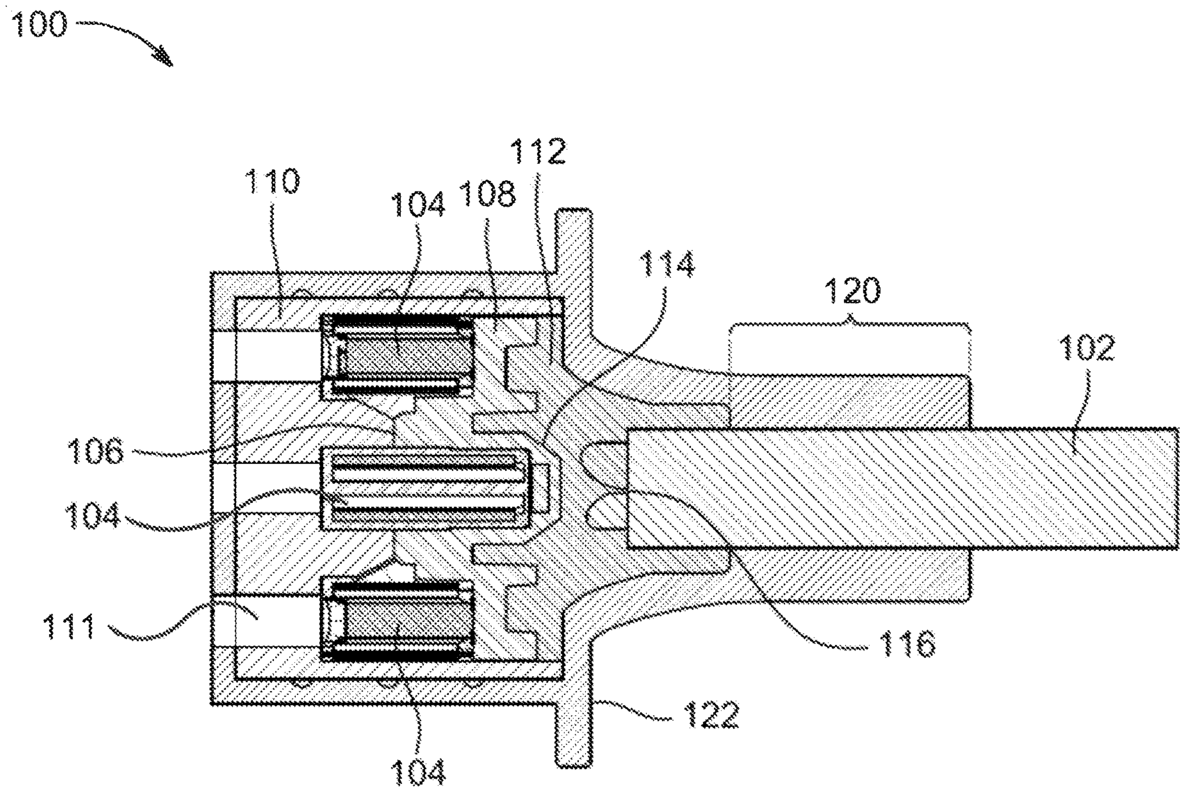
FIG. 1 depicts an exemplary illustration of a cross-section view of a connector in accordance with an embodiment.

The disclosure herein is directed to a connector, such as a C13 connector, that requires a compact or reduced length/horizontal body shape to its design, with improved compact cable routing and improved tensile strength to the connector when a tensile force is applied to the cable. As illustrated by the cross-section view of FIG. 1, an embodiment of the connector 100 may include a cable 102 that may terminate at the connector 100. The cable 102 may include a plurality of cores, each core surrounding a copper or similarly conductive wire that may be connected to a terminal 104, as more fully illustrated in FIG. 2. The terminals 104 may also be formed of copper or a similarly conductive material.

The terminals 104 and cores and wires may be held in place by a cable holder 108 positioned with a housing 110. The housing 110 includes a first end proximal the terminal end 116 of the cable 102 and a second end opposite the first end. The cable holder 108 includes a first end 114 proximal the terminal end 116 and an opposite second end 106. The cable holder includes spacing between the second end 106 and the second end of the housing 110 for the terminal slots 111 that correspond to each terminal 104. Once the terminals 104, cable holder 108 and cores and wires are installed in the housing 110, an inner mold 112 of polyvinyl chloride (PVC), engineering plastic, or a similarly non-conductive material may be injected around the second end 114 of the cable holder, around any exposed cores, and around a first portion of the terminal end 116 of the cable 102. An over mold 118 of PVC or a similarly non-conductive material may then be injected around the exposed surfaces of the housing 110, the inner mold 112, and a second portion 120 of the cable 102. The over mold 118 may include an integrated flange 122. The profile of the integrated flange can be of any form of shape or any profile with any texture or color.

Figure 2:
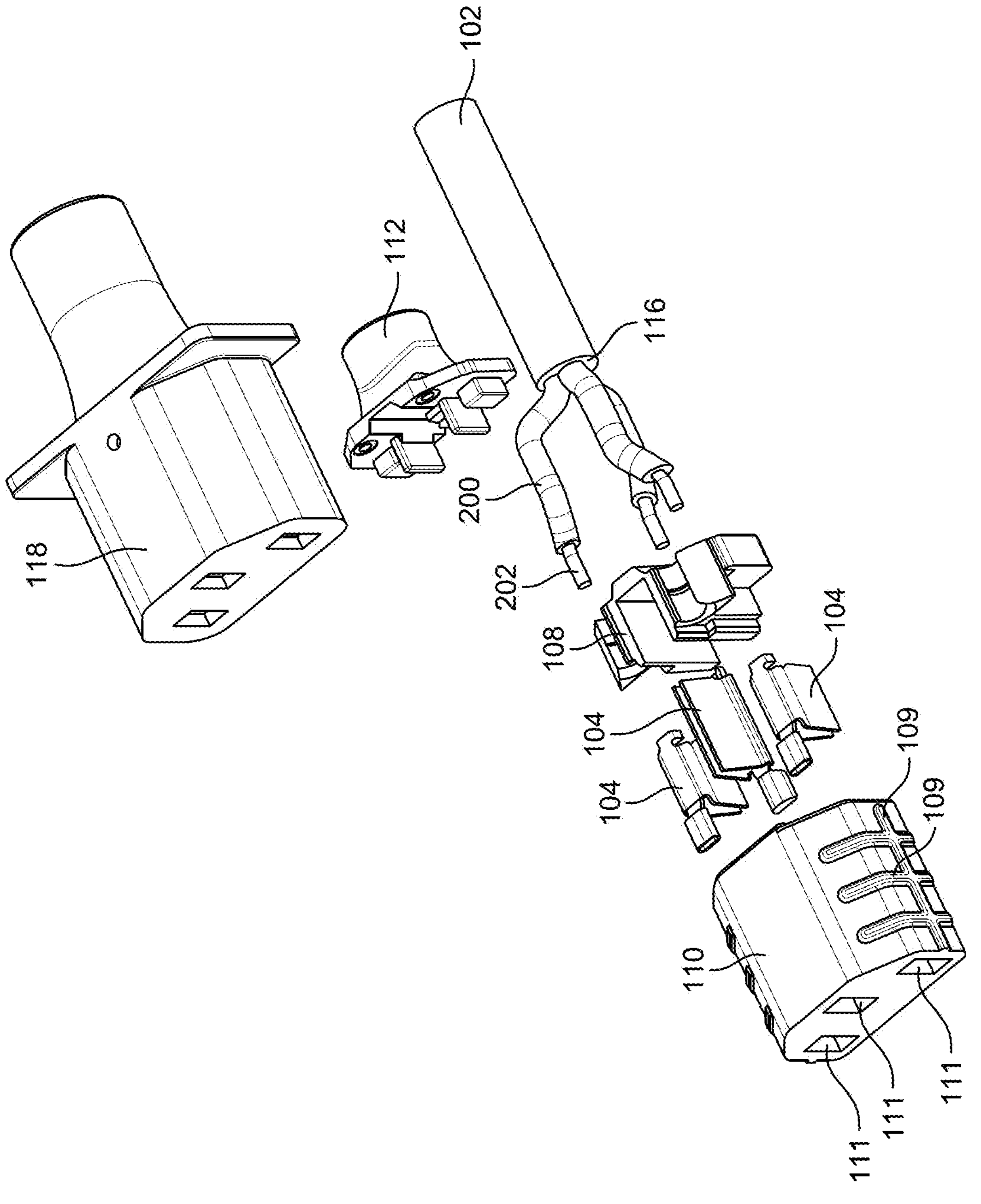
FIG. 2 depicts an exemplary illustration of an exploded view of the connector of FIG. 1 in accordance with an embodiment.
Figure 3A:
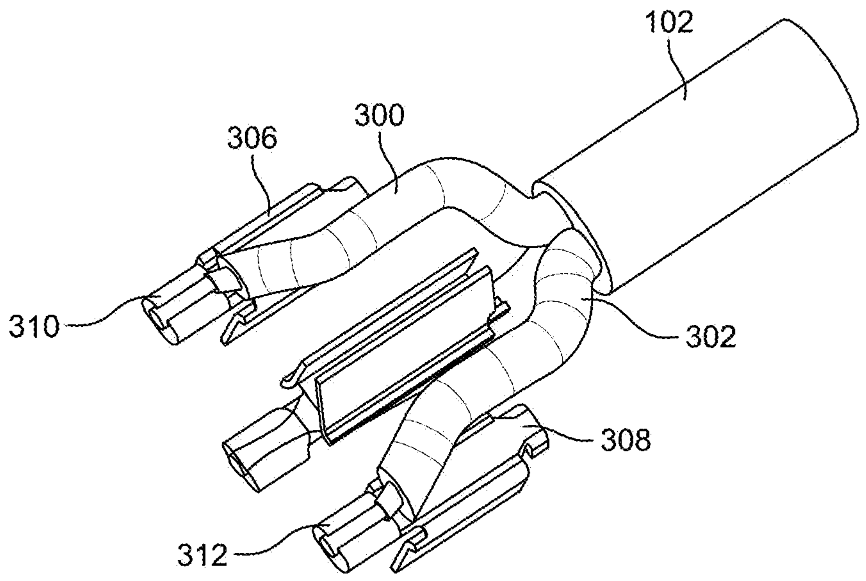
FIG. 3A and FIG. 3B are exemplary illustrations of a perspective view of cores routed to terminals and wires of the cores reverse crimped in accordance with an embodiment.
Figure 3B:
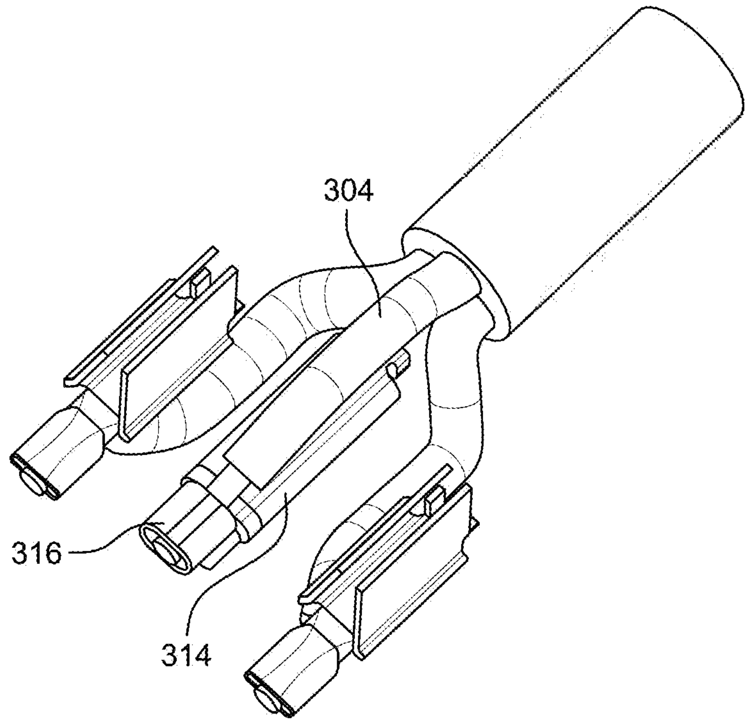

An exemplary illustration of an exploded view of the connector of FIG. 1, in accordance with an embodiment, is illustrated in FIG. 2. As previously noted, the cable 102 may include a plurality of cores 200, in this case three cores, each of which includes a wire 202 that is insulated by the core 200. As more fully illustrated in FIG. 3A and FIG. 3B, the three wires of the cores 200 and cable 102 may include a live wire 300, a neutral wire 302 and a ground or earth wire 304. As illustrated in FIG. 3A, the live wire 300 and neutral wire 302, the positions of which may be interchanged, may be routed under each of terminals 306 and 308 and reverse crimped at front crimps 310 and 312. Likewise, as illustrated in FIG. 3B, the earth or ground wire 304 may be routed over the top of the terminal 314 and reverse crimped at first crimp 316. Reverse crimping, where the crimp is above or below the terminal, allows the crimp and the terminal to occupy the same vertical space and reduced horizontal space or length. By reverse crimping the wires at the first side (distal the terminal end 116 of the cable 102) or front of the terminals, it may be possible to make a more compact design that reduces the overall horizontal length of the connector as no additional length is required at the opposite second side (proximal the terminal end 116 of the cable 102) or back of the terminals 306, 308 and 314 and the additional length required at the first side or front of the terminals is already provided by the holder 110 and over mold 118, as shown in FIG. 1.

The housing 110 may also include a plurality of raised areas 109 that are configured to engage the over mold and restrain the over mold from pulling loose of the housing. As illustrated, the raised areas may be on both sides of the housing 110 and may include one or more horizontal members and one or more vertical members. Instead of the areas 109 being raised, the areas may be inset within the housing so that the over mold fills the areas 109.

Figure 4A:
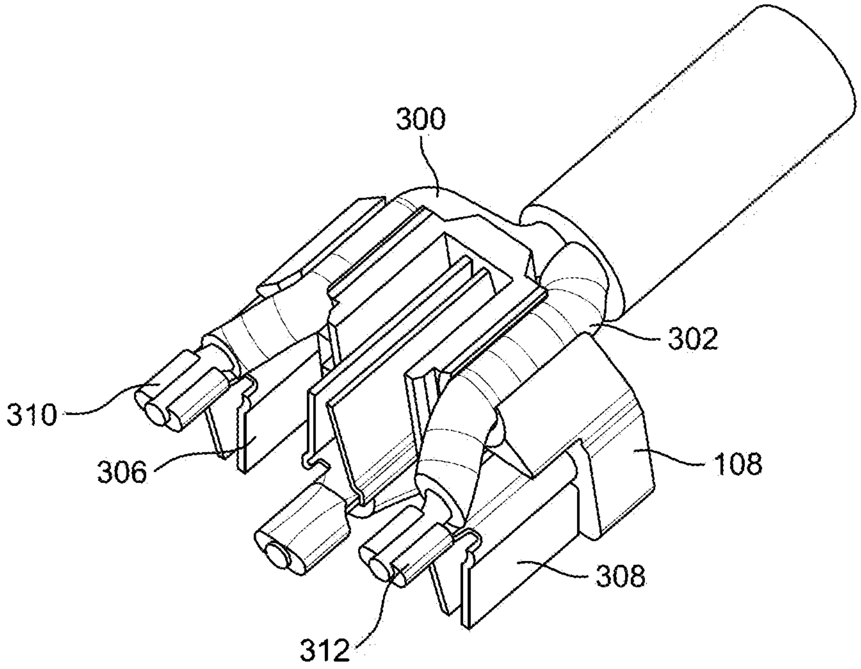
FIG. 4A and FIG. 4B are exemplary illustrations of a perspective view of a holder for the cores and the terminals of FIG. 3A and FIG. 3B, and assembly of the same in accordance with an embodiment.
Figure 4B:
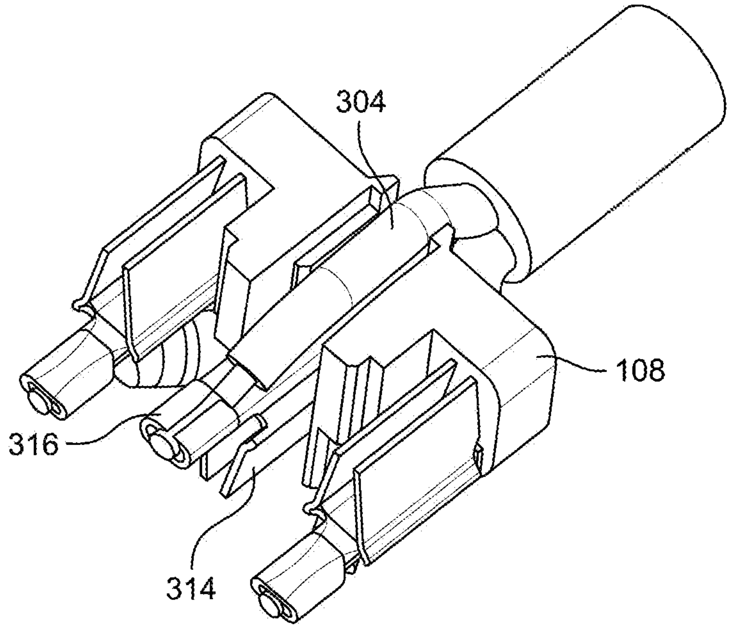

FIG. 4A and FIG. 4B provide an exemplary illustration of a perspective view of a holder for the cores and the terminals of FIG. 3A and FIG. 3B and the assembly of the same in accordance with an embodiment. As shown in FIG. 4A, the cable holder 108 is positioned at the second side of the terminals 306 and 308 so as to hold and route the live wire 300 and neutral wire 302 relative to the terminals 306 and 308 to the front side of the terminals. Likewise, in FIG. 4B, the cable holder 108 is also positioned at the second side of the terminal 314 so as to hold and route the earth or ground wire 304 relative to the terminal 314 to the front side of the terminals. The cable holder 108 may be formed of polyvinyl chloride (PVC), engineering plastic, or a similarly non-conductive material.

Figure 5A:
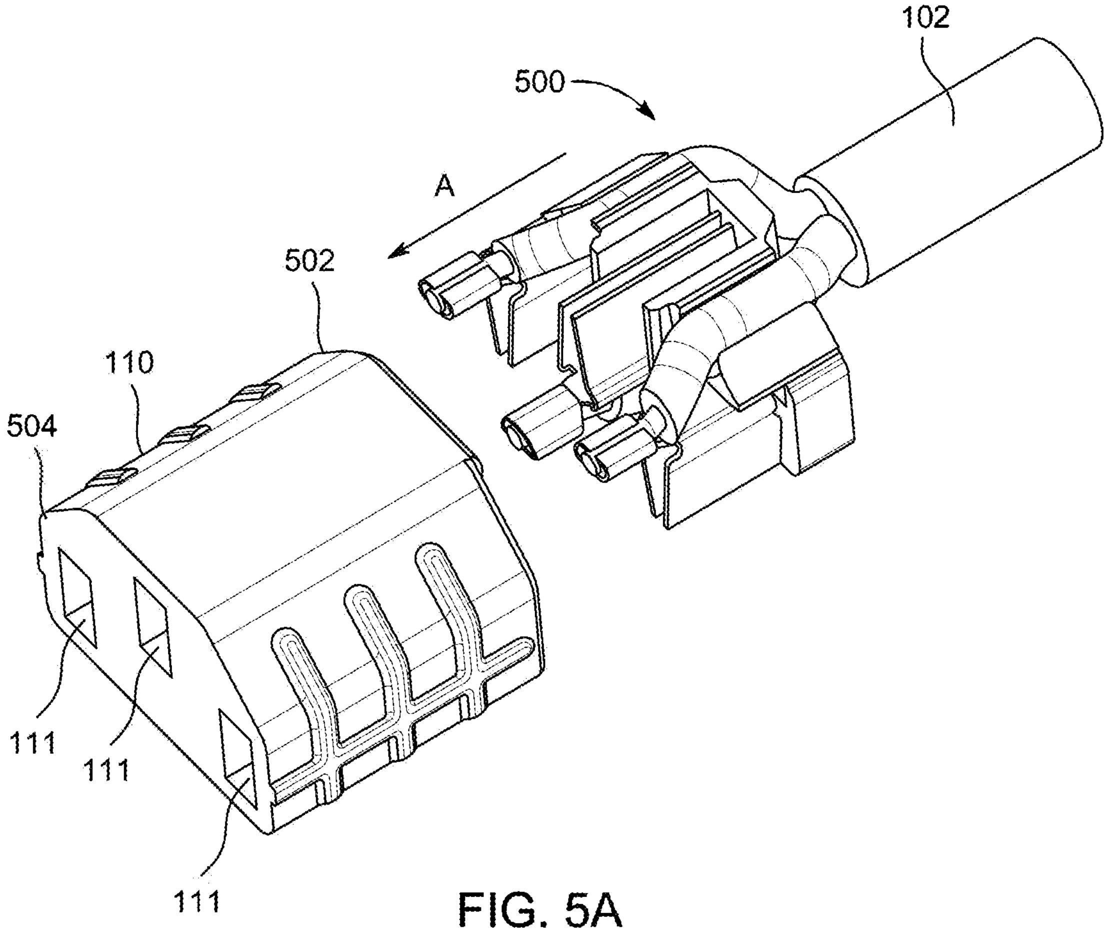
FIG. 5A and FIG. 5B are exemplary illustrations of perspective views of an interior housing for the cores and terminals of FIG. 4A and FIG. 4B and assembly of the same in accordance with an embodiment.
Figure 5B:
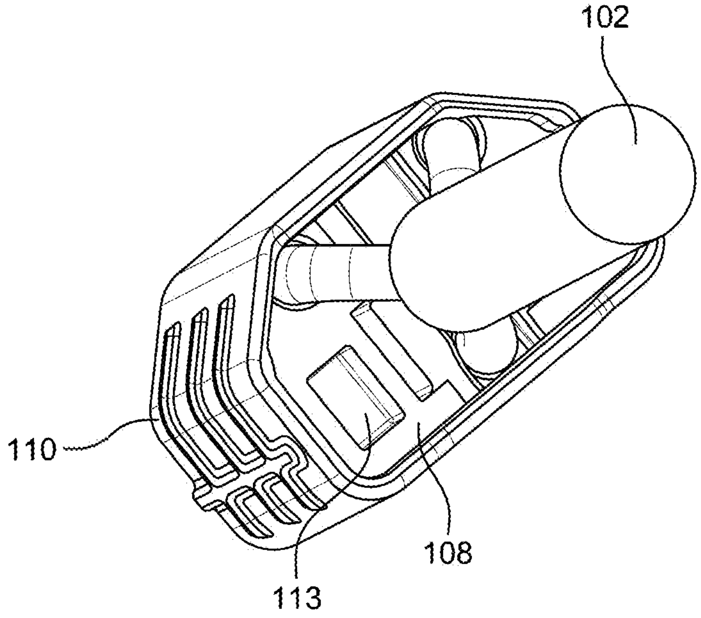

FIG. 5A and FIG. 5B are exemplary illustrations of perspective views of an interior housing for the cores and terminals of FIG. 4A and FIG. 4B and assembly of the same in accordance with an embodiment. After placement of the cable holder 108 relative to the wires and terminals, the resulting terminal assembly 500 is inserted into the interior housing 110 through an opening in the second side 502 of the interior housing 110 opposite the first side 504 of the interior housing 110. The first side 504 of the interior housing 110 initially forms the terminal slots 111. FIG. 5B illustrates that second side of the cable housing 108 includes a plurality of insets or grooves 113 that are configured to be filled by the inner mold 112.

Figure 6:
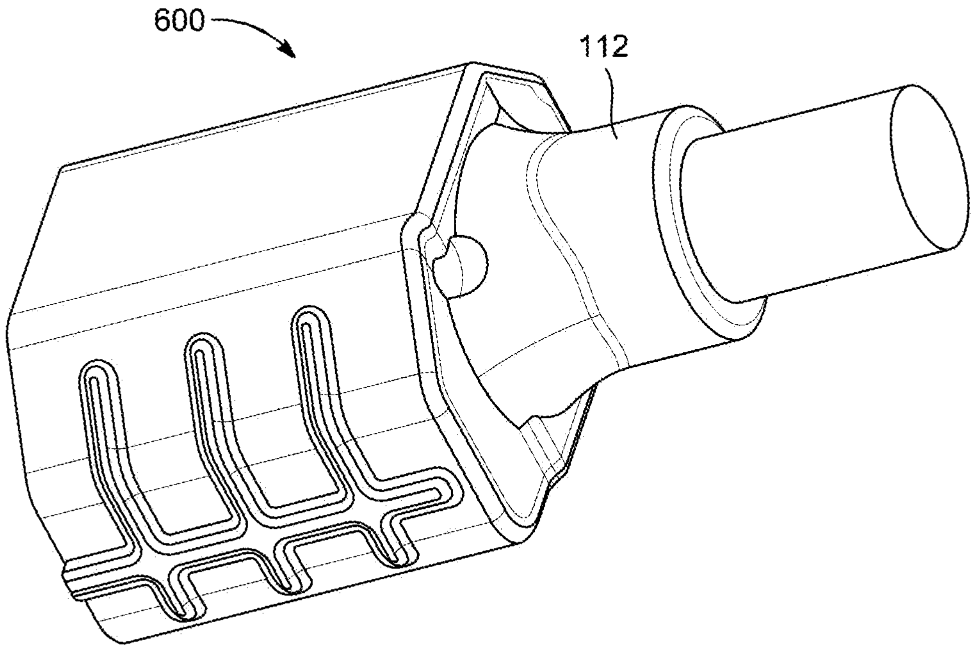
FIG. 6 is an exemplary illustration of a perspective view of the assembled housing of FIG. 5A and FIG. 5B after application of an inner mold in accordance with an embodiment.

FIG. 6 is an exemplary illustration of a perspective view of the housing assembly 600 of FIG. 5 after application of an inner mold 112 in accordance with an embodiment. To inject the inner mold 112, the housing assembly 600 is placed in a first mold (not shown) that isolates the space within which the material for the inner mold 112 is to be formed, and then the heated material is injected into the first mold to form the inner mold 112.

Figure 7A:
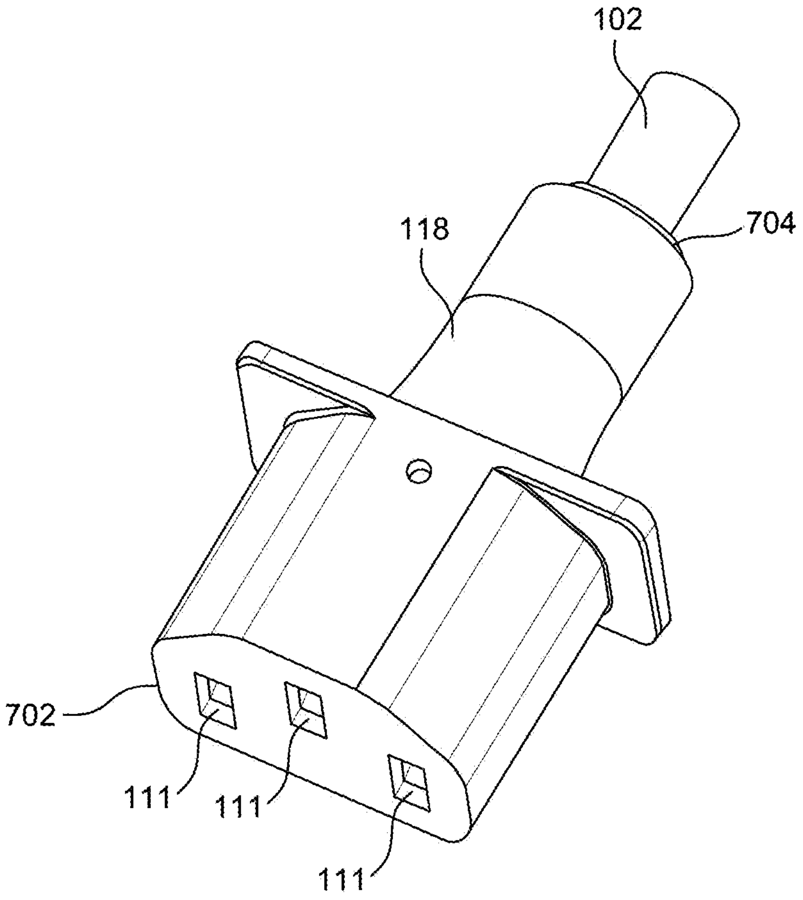
FIG. 7A and FIG. 7B are exemplary illustrations of a front and rear perspective view of the completed connector including an over mold in accordance with an embodiment.
Figure 7B:
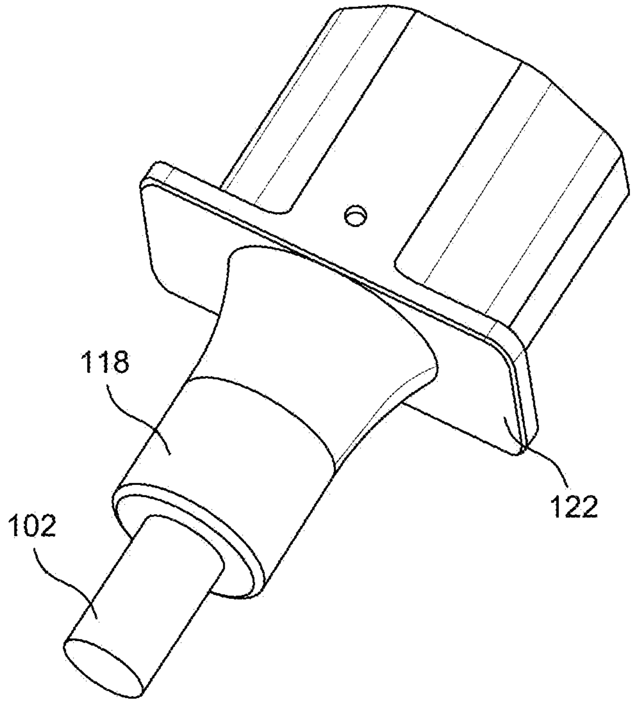

FIG. 7A and FIG. 7B are exemplary illustrations of a front perspective view of the completed connector including an over mold 118 in accordance with an embodiment. To inject the outer mold 118, the housing assembly 600 and the completed inner mold 112 are placed in a second mold (not shown) that isolates the space within which the material for the outer mold 118 is to be formed, and then the heated material is injected into the second mold to form the outer mold 118 and complete the connector 100. FIG. 7A illustrates the completed connector 100 with the terminal slots 111 formed within a first end 702 and cable 102 entering the connector 100 from an opposite second end 704. FIG. 7B illustrates the same connector from the second side 704 and better illustrates the flange 122 that is integrally formed in the outer mold 118. The flange 122 may be configured to abut an outlet (not shown) into which the connector 100 is inserted when in use.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In an embodiment, a compact electrical power connector comprises a cable with a plurality of cores surrounded by cable insulation, each core among the plurality of cores including a wire surrounded by a core insulation, a terminal end of the cable having a portion of the cable insulation removed to expose a portion of each core and each core having a portion of the core insulation removed to expose a portion of each wire; a plurality of terminals, each terminal among the plurality of terminals corresponding to one wire each terminal having a first end proximal the terminal end of the cable and a second end opposite the first end of the terminal, the second end of the terminal including a crimp; a cable holder supporting and routing each core among the plurality of cores and each wire among the plurality of wires to the crimp of the corresponding terminal such that each wire is reverse crimped to the terminal, the cable holder having a first end proximal the terminal end of the cable and a second end opposite the first end of the cable holder; a housing having a first end proximal the terminal end of the cable and a second end opposite the first end of the housing, the cable holder and plurality of terminals being inserted within an opening of the first end of the housing; an inner mold injected inside the first end of the housing around the first end of the cable holder and around an exposed portion of each core and a first portion of the terminal end of the cable; and an over mold injected around exposed surfaces of the housing, the inner mold and a second portion of the terminal end of the cable.

In the embodiment, wherein the over mold includes an integrated flange positioned at the first end of the housing. In the embodiment, wherein the flange is configured to abut an outlet when the connector is plugged into the outlet.

In the embodiment, wherein the connector is a C13 connector.

In the embodiment, wherein the second end of the housing includes a housing terminal slot corresponding to each terminal configured to receive a connector pin of an outlet. In the embodiment, wherein the over mold includes an over mold terminal slot corresponding to each housing terminal slot.

In the embodiment, wherein the housing includes a plurality of raised areas configured to engage the over mold and restrain the over mold from pulling loose of the housing.

In the embodiment, wherein the inner mold includes a first end proximal the terminal end of the cable and wherein the first end includes a plurality of retention features configured to engage the over mold and restrain the over mold from pulling loose of the housing. In the embodiment, wherein the plurality of retention features include a series of embedded closed end openings in the inner mold.

In an embodiment, a method of manufacturing a compact electrical power connector, comprises removing cable insulation around a plurality of cores at a terminal end of a cable to expose a portion of the plurality of cores; removing core insulation around a wire of each core among the plurality of cores to expose a portion of each wire; placing a terminal corresponding to each wire in a cable holder; placing each wire in the cable holder to route each wire to a corresponding terminal; reverse crimping each wire to the corresponding terminal to create a terminal assembly having a first side and a second side opposite the first side; inserting the second side of the terminal assembly into a housing including a housing terminal slot corresponding to each terminal at a second end of the housing, wherein the first side of the terminal assembly is exposed at a first end of the housing opposite the second end of the housing; placing the housing and the cable into a first mold and injecting the first mold with one of a polyvinyl chloride and an engineering plastic material to form an inner mold covering the exposed first side, exposed cores at the terminal end of the cable, and a first portion of the cable near the terminal end of the cable; and placing the housing, the inner mold and the cable into a second mold and injected the second mold with polyvinyl chloride material to form an over mold covering any exposed surfaces of the housing, the inner mold and a second portion the cable adjacent to the first portion of the cable.

In the embodiment, wherein the second mold forms an integrated flange in the over mold, the flange positioned at the first end of the housing. In the embodiment, wherein the flange is configured to abut an outlet when the connector is plugged into the outlet.

In the embodiment, wherein the connector is a C13 connector.

In the embodiment, wherein the over mold forms an outer terminal slot corresponding to each housing terminal slot In the embodiment, wherein the housing includes a plurality of raised areas configured to engage the over mold and restrain the over mold from pulling loose of the housing. In the embodiment, wherein the inner mold includes a first end proximal the terminal end of the cable and wherein the first end includes a plurality of retention features configured to engage the over mold and restrain the over mold from pulling loose of the housing. In the embodiment, wherein the plurality of retention features include a series of embedded closed end openings in the inner mold.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A compact electrical power connector, comprising:

a cable with a plurality of cores surrounded by cable insulation, each core among the plurality of cores including a wire surrounded by a core insulation, a terminal end of the cable having a portion of the cable insulation removed to expose a portion of each core and each core having a portion of the core insulation removed to expose a portion of each wire;

a plurality of terminals, each terminal among the plurality of terminals corresponding to one wire, each terminal having a first end proximal the terminal end of the cable insulation and a second end opposite the first end of the terminal, the second end of the terminal including a crimp, wherein each core among the plurality of cores and each wire among the plurality of wires are routed within the compact connector past the first end of its corresponding terminal and to the crimp of the corresponding terminal such that each wire is reverse crimped to the terminal;

a housing having a first end proximal the terminal end of the cable and a second end opposite the first end of the housing, the plurality of terminals being inserted within an opening of the first end of the housing; and a mold injected around exposed surfaces of the housing and a second portion of the terminal end of the cable.

2. The compact connector of claim 1, wherein the over includes an integrated flange positioned at the first end of the housing.

3. The compact connector of claim 2, wherein the flange is configured to abut an outlet when the connector is plugged into the outlet.

4. The compact connector of claim 1, wherein the connector is a C13 connector.

5. The compact connector of claim 1, wherein the second end of the housing includes a housing terminal slot corresponding to each terminal configured to receive a connector pin of an outlet.

6. The compact connector of claim 5, wherein the mold includes a mold terminal slot corresponding to each housing terminal slot.

7. The compact connector of claim 1, wherein the housing includes a plurality of raised areas configured to engage the mold and restrain the mold from pulling loose of the housing.

8. The compact connector of claim 1, further comprising:

a cable holder supporting, and providing the routing for, each core among the plurality of cores and each wire among the plurality of wires; and an inner mold injected inside the first end of the housing around the first end of the cable holder and around an exposed portion of each core and a first portion of the terminal end of the cable.

9. The compact connector of claim 8, wherein the inner mold includes a first end proximal the terminal end of the cable and wherein the first end includes a plurality of retention features configured to engage the mold and restrain the mold from pulling loose of the housing.

10. The compact connector of claim 9, wherein the plurality of retention features includes a series of embedded closed end openings in the inner mold.

11. A method of manufacturing a compact electrical power connector, comprising:

removing cable insulation around a plurality of cores at a terminal end of a cable to expose a portion of the plurality of cores;

removing core insulation around a wire of each core among the plurality of cores to expose a portion of each wire;

routing each wire past a first end of a corresponding terminal closest to the terminal end of the cable and to a crimp at a second end of its corresponding terminal opposite the first end;

reverse crimping each wire to the crimp of the corresponding terminal to create a terminal assembly having a first side and a second side opposite the first side;

inserting the second side of the terminal assembly into a housing including a housing terminal slot corresponding to each terminal at a second end of the housing, wherein the first side of the terminal assembly is exposed at a first end of the housing opposite the second end of the housing; and placing the housing and the cable into a first mold and injecting the first mold with polyvinyl chloride material to form a mold covering any exposed surfaces of the housing and the cable.

12. The method of claim 11, wherein the first mold forms an integrated flange in the mold, the flange positioned at the first end of the housing.

13. The method of claim 12, wherein the flange is configured to abut an outlet when the connector is plugged into the outlet.

14. The method of claim 11, wherein the connector is a C13 connector.

15. The method of claim 11, wherein the mold forms an outer terminal slot corresponding to each housing terminal slot.

16. The method of claim 11, wherein the housing includes a plurality of raised areas configured to engage the mold and restrain the mold from pulling loose of the housing.

17. The method of claim 11, further comprising:

placing a terminal corresponding to each wire in a cable holder;

placing each wire in the cable holder; and placing the housing and the cable into a second mold and injecting the second mold with one of a polyvinyl chloride and an engineering plastic material to form an inner mold covering the exposed first side, exposed cores at the terminal end of the cable, and a first portion of the cable near the terminal end of the cable.

18. The method of claim 17, wherein the inner mold includes a first end proximal the terminal end of the cable and wherein the first end includes a plurality of retention features configured to engage the mold and restrain the mold from pulling loose of the housing.

19. The method of claim 18, wherein the plurality of retention features includes a series of embedded closed end openings in the inner mold.

* * * * *